United States Patent
Fisk et al.

(10) Patent No.: US 9,592,952 B2
(45) Date of Patent: Mar. 14, 2017

(54) COMPOSITION FOR PREPARING A BEVERAGE OR FOOD PRODUCT COMPRISING A PLURALITY INSOLUBLE MATERIAL BODIES

(75) Inventors: Ian Denis Fisk, Loughborough (GB); Ayse Tulay Massey, Banbury (GB)

(73) Assignee: Koninklijke Douwe Egberts B.V., Utrecht (NL)

(*) Notice: Subject to any disclaimer, the term of this patent is extended or adjusted under 35 U.S.C. 154(b) by 906 days.

(21) Appl. No.: 13/701,004

(22) PCT Filed: May 26, 2011

(86) PCT No.: PCT/US2011/038131
§ 371 (c)(1),
(2), (4) Date: Feb. 4, 2013

(87) PCT Pub. No.: WO2011/153064
PCT Pub. Date: Dec. 8, 2011

(65) Prior Publication Data
US 2013/0122156 A1    May 16, 2013

(30) Foreign Application Priority Data

Jun. 1, 2010 (GB) .................................... 1009179.1

(51) Int. Cl.
*B65D 85/804* (2006.01)
*A23F 5/14* (2006.01)
(Continued)

(52) U.S. Cl.
CPC ............ *B65D 85/8043* (2013.01); *A23F 5/14* (2013.01); *A23L 2/39* (2013.01); *A23L 5/55* (2016.08);
(Continued)

(58) Field of Classification Search
CPC . B65D 85/8043; B65D 55/8046; B65B 11/00; A23F 5/14; A23L 2/39; A23L 5/55
See application file for complete search history.

(56) References Cited

U.S. PATENT DOCUMENTS

| 5,901,635 A | 5/1999 | Lucas et al. |
| 2005/0048186 A1 | 3/2005 | Lehmberg |

(Continued)

FOREIGN PATENT DOCUMENTS

| EP | 0904717 A1 | 3/1999 |
| EP | 0949294 A1 | 10/1999 |

(Continued)

OTHER PUBLICATIONS

Elragi, A.F., Selected Engineering Properties and Application of EPS Geofoam 2006, retrieved May 5, 2016. Retrieved from the Internet: URL<http://www.michiganfoam.com/docs/eps_geofoam_selected_engineering_properties.pdf>.*

(Continued)

*Primary Examiner* — Erik Kashnikow
*Assistant Examiner* — Chaim Smith
(74) *Attorney, Agent, or Firm* — Fitch, Even, Tabin & Flannery LLP

(57) ABSTRACT

The present invention relates to improvements in the preparation of beverage and food products and, in particular, to an improved composition for preparing beverage and food products in machines. The composition is 10 prepared by the addition of a liquid to said composition and comprises one or more beverage or food ingredients and at least one preparation aid. The preparation aid comprises a plurality of bodies formed from a substantially insoluble material and the preparation aid is selected to have a 15 predetermined effect on the interaction between the liquid and the composition. The bodies have a diameter in the range of 0.1 mm to 200 mm, and preferably in the range of 1 to 20 mm or in the range of 100 to 200 mm.

22 Claims, 4 Drawing Sheets

(51) Int. Cl.
*A23L 2/39* (2006.01)
*B65B 11/00* (2006.01)

(52) U.S. Cl.
CPC .......... *B65B 11/00* (2013.01); *B65D 85/8046* (2013.01)

(56) References Cited

U.S. PATENT DOCUMENTS

| | | |
|---|---|---|
| 2005/0158426 A1 | 7/2005 | Hu |
| 2007/0048429 A1 | 3/2007 | Griffiths et al. |
| 2007/0051836 A1 | 3/2007 | Kirschner et al. |
| 2008/0260928 A1* | 10/2008 | MacMahon ........ B65D 85/8046 426/588 |

FOREIGN PATENT DOCUMENTS

| | | |
|---|---|---|
| EP | 1440903 A1 | 7/2004 |
| EP | 2062831 A2 | 5/2009 |
| GB | 2006603 A | 5/1979 |
| GB | 2334659 A | 9/1999 |
| GB | 2468047 A | 8/2010 |
| JP | 06038681 | 2/1994 |
| JP | 2007535332 A | 12/2007 |
| JP | 2010519998 A | 6/2010 |
| RU | 2340527 | 12/2008 |
| WO | 02074661 A1 | 9/2002 |
| WO | 2004077964 A1 | 9/2004 |
| WO | 2006043102 A1 | 4/2006 |
| WO | 2007009600 A1 | 1/2007 |
| WO | 2008107645 A2 | 9/2008 |
| WO | 2011031294 A2 | 3/2011 |
| WO | 2011087900 A1 | 7/2011 |

OTHER PUBLICATIONS

United Kingdom Patent Office, Search Report under Section 17, dated Sep. 30, 2010, from corresponding GB Patent App. No. GB1009179.1, 2 pages.
United Kingdom Patent Office, Combined Search and Examination Report under Sections 17 & 18(3) dated Oct. 1, 2010, from corresponding GB Patent App. No. GB1009179.1, 2 pages.
United Kingdom Patent Office, Examination Report under Section 18(3), dated Jul. 19, 2011, from corresponding GB Patent App. No. GB1009179.1, 2 pages.
Response dated May 19, 2011, from corresponding GB Patent App. No. GB1009179.1, 2 pages.
Response dated May 24, 2012, from corresponding GB Patent App. No. GB1009179.1, 2 pages.
Response dated Sep. 18, 2012, from corresponding GB Patent Application No. 1009179.1, 2 pages.
European Patent Office, Communication of a Notice of Opposition, dated Feb. 20, 2015, from corresponding European Patent Application No. 11724352.7, 13 pages.
Response dated Jul. 25, 2013, from corresponding European Patent App. No. 11724352.7, 2 pages.
Japanese Patent Office, Office Action dated Jun. 30, 2015, from corresponding Japanese Patent Application 2013-513240, 5 pages.
Response to the Communication of Notice of Opposition dated Jun. 4, 2015, from corresponding European Patent Application No. EP2575489, 10 pages.
International search report mailed Sep. 27, 2011, for International Application No. PCT/US2011/038131.
Japanese Patent Office, Office Action dated Nov. 4, 2014, from corresponding Japanese Patent Application 2013-513240, 3 pages.
Chinese Patent Office, Office Action dated Oct. 10, 2013, from corresponding Chinese Patent Application 201180038072.x, 10 pages.
United Kingdom Intellectual Property office, Examination Report for corresponding United Kingdom Patent Application No. GB1009179.1, dated Nov. 20, 2012, 3 pages.
United Kingdom Intellectual Property office, Examination Report from corresponding United Kingdom Application No. GB1009179.1, dated Jul. 20, 2012, 6 pages.
Search Results, search performed Jun. 2, 2009, 55 pages.
Japanese Patent Office, English Translation of Reexamination Report dated Jan. 15, 2016, from corresponding Japanese Patent Application 2013-513240, 2 pages.
Russian Patent Office, Office Action issued Apr. 22, 2015, from corresponding Russian Patent Application 2012155059, 7 pages.

* cited by examiner

COMPOSITION FOR PREPARING A BEVERAGE OR FOOD PRODUCT COMPRISING A PLURALITY INSOLUBLE MATERIAL BODIES

CROSS REFERENCE TO RELATED APPLICATIONS

This application is a U.S. national phase application of International Application No. PCT/US2011/038131, filed May 26, 2011, designating the United States, which claims benefit from United Kingdom Application No. 1009179.1, filed Jun. 1, 2010, both which are hereby incorporated herein by reference in their entirety.

FIELD

The present invention relates to improvements in the preparation of beverage and food products and, in particular, to an improved composition for preparing beverage and food products in machines.

BACKGROUND

Automated brewing machines for brewing beverages such as coffee and tea, also known as on-demand systems, usually have a brewing water reservoir in which water is heated by a heating element. The heated water is then transferred from the reservoir to a brewing chamber which contains the brewing ingredients, such as coffee grounds or tea leaves, through which the heated water flows to produce a brewed beverage. The beverage flows into a container such as a jug or cup located beneath the brewing chamber outlet.

Many modern domestic beverage machines dispense individual servings of a beverage directly into a drinking receptacle, and derive the beverage either from a bulk supply of beverage ingredients or from individual packages of beverage ingredients such as pods, pads or cartridges. Machines which use such packages reduce the need for cleaning and can enable the user to make a selection of beverages such as coffee, tea, hot chocolate and the like as well as food products such as soup, custard and the like. The beverages are formed from brewing, mixing, dissolving or suspending the beverage or food ingredients in water. For example, for coffee beverages, heated water is forced through the package under pressure to extract the aromatic constituents from the compacted coffee grounds contained therein. The use of packages in such machines has become increasingly popular due to their convenience and the quality of the beverage produced.

EP-A-0904717 describes a package in the form of a soft flexible pod or pouch which is made from two discs of filter paper which are connected around their perimeters by a seam. The pod is designed so that hot water can be fed under pressure and passed through the pod which is filled with the beverage ingredients. However a significant problem with this type of soft pod lies in that its shape and design is not ideal to enable the flow of water through the pod to be accurately controlled. The pod of EP-A-0904717 therefore requires the use of a specially designed container in which the pods are placed before they can be used in the beverage machine.

This problem can be overcome in more rigid packages such as the cartridges described in EP-A-1440903. This type of cartridge is formed from high density polyethylene, polypropylene, polystyrene, polyester, or a laminate of two or more of these materials. The cartridge has an inlet for the introduction of water into the cartridge, and an outlet for a beverage produced from the beverage ingredients. The cartridge comprises an outer member, an inner member inserted in the outer member and an aperture in a beverage flow path linking the inlet to the outlet for producing a jet of the beverage. In order to optimise the quality of some types of beverage it is necessary to maximize the extraction of the beneficial flavours of the beverage ingredients (such as coffee), while minimizing the extraction of bitter compounds and undesirable components. This is achieved by optimising a number of different brew parameters. It is acknowledged, by discerning coffee drinkers, that coffee produced using water which is cooler than the optimum temperature tastes sour and that produced with water which is hotter than this temperature tastes bitter. The sour taste, which occurs if the temperature is too low, is due to under extraction, since the acids from the beans are the first substances to dissolve. The optimum temperature for espresso is claimed, by some baristas to be between 92 and 96° C. Other factors which affect the quality of coffee include the roasting and age of the coffee beans, the grind size, the compaction of the grinds prior to brewing, and the brew time. The highest quality coffee is achieved by balancing these key elements of the brewing process.

Different flow rates of the brewing water (or other liquid) through an on-demand beverage machine will therefore lead to a variation of characteristics in the brewed beverage, and in particular to its taste. U.S. Pat. No. 5,901,635 explains that a relatively fast rate of flow of hot water through coffee grounds in the brewing chamber will result in relatively dilute coffee with less flavour and caffeine than is produced by a slower rate of flow. A relatively slow rate should therefore be used in order to correctly brew a decaffeinated coffee drink with a taste comparable to "regular" or caffeinated coffee which is brewed with a relatively faster rate of flow. The flow rate can he determined by a number of variables, such as the rate at which water is introduced to the reservoir, the size of the conduit or passage between the reservoir and the brewing chamber, and the size of holes in a water distributor or showerhead over the brewing chamber. U.S. Pat. No. 5,901,635 uses an adjustable valve between the filling chamber and the reservoir to adjust the rate of flow of water from the filling chamber to the reservoir.

WO-02/074661 describes a device for preparing customisable brewed beverages and proposes the use of two ingredient extraction chambers each containing a different volume of ingredients, such as roast and ground coffee. The strength of the finished brewed beverage can be modified by directing the brewing fluid through one or other of the chambers, or dividing the flow to go through each chamber. In another embodiment described in this prior art document, different ingredients are provided in different chambers.

However most on-demand machines typically have a preset non-variable water flow rate and temperature. It is therefore desirable to find other ways of modifying at least one preparation parameter to change the characteristics, preferably to improve the quality, of the beverage or food product. This is particularly desirable for machines which use soft pods, through which it is more difficult to control the water flow than rigid cartridges.

SUMMARY

The invention therefore provides a composition for preparing a beverage or food product by the addition of a liquid to said composition, said composition comprising one or more beverage or food ingredients and at least one preparation aid which has a predetermined effect on the interaction between the liquid and the composition, said preparation aid comprising a plurality of bodies formed from a substantially insoluble material, in which the bodies have a diameter in the range of 0.1 mm to 200 mm, and preferably in the range of 1 to 20 mm or in the range of 100 to 200 mm.

The interaction can be modified in a number of ways to achieve a particular effect, such as increased extraction, increased crema or foam, better dissolution, greater separation of solids, increased hydration etc. The invention thus provides a means of optimising the preparation of beverage and foods products in a way that can be utilised in an open on-demand machine with a predefined water flow rate and temperature.

The materials of the bodies is preferably substantially impermeable.

The predetermined effect preferably substantially prevents movement of the ingredient(s) in the liquid or promotes agitation of the ingredient(s) in the liquid.

The bodies are preferably non-buoyant.

Preferably the bodies have a shape or structure including a plurality of edges and/or corners and/or a shape or structure which promotes turbulent flow of liquid flowing in or around the bodies.

The bodies may have a shape, structure or textured surface such that, when the bodies compact together, small flow paths are created therebetween or they may have a smooth surface.

The bodies are preferably buoyant.

The bodies are substantially of the same size or alternatively of at least two different sizes.

The preparation aid preferably comprises a combination of non-buoyant and buoyant bodies.

The invention also comprises a package containing a composition as described above, said package comprising a chamber in which the beverage or food product is prepared having an inlet for the addition of liquid to the chamber and an outlet for dispensing the prepared product.

Preferably the package is a soft pod or an at least semi rigid cartridge.

The invention also comprises a method of producing the above mentioned package comprising the steps of filling the package with the above mentioned composition.

BRIEF DESCRIPTION OF THE DRAWINGS

Embodiments of the present invention will now be described, by way of example only, with reference to the accompanying drawings, in which.

DETAILED DESCRIPTION

Figure 1:
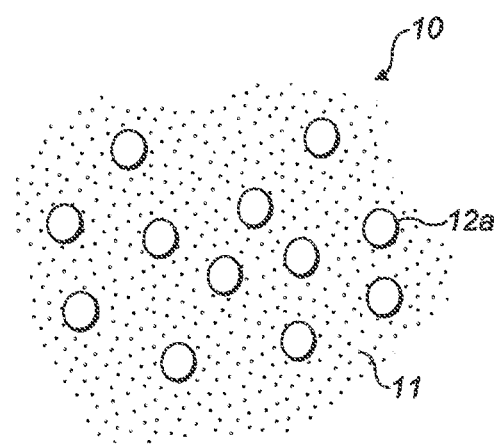
FIG. 1 is a plan view of a sample of the composition of the present invention.

Whilst the invention is primarily intended for improving brewed beverages such as tea and coffee produced by brewing machines, it also has application for the preparation of many other beverage and food products which are formed by mixing, dissolving or suspending the beverage or food ingredients in a liquid such as water.

The beverage or food composition 10 of the present invention comprises one or more ingredients 11 suitable for the preparation of a beverage or food product and at least one preparation aid 12 comprising a plurality of bodies 12a. The bodies 12a may be independent, or linked in a way that they can move relative to each other.

The composition 10 is preferably contained in a package 15, 20 which has a chamber (which term includes an enclosed space in a flexible pod) 23 in which the preparation process takes place. The preparation aid 12 remains in the chamber 23 and is designed to modify the interaction of the water or other liquid with the ingredients in the chamber 23 during the preparation of the beverage or food product. The interaction can be modified in a number of ways to achieve a particular effect, such as increased extraction, increased crema or foam, better dissolution, greater separation of solids, increased hydration etc.

The bodies 12a of the preparation aid 12 are constructed of a food grade material, i.e. one which resists degradation from the beverage ingredients and complies with food/health and safety regulations. The material itself is impermeable, insoluble and preferably tasteless and imparts little or no flavour to the final beverage product. The form of the bodies 12a may be such that, as a whole, they are not impermeable, i.e. the liquid can flow through small pathways within the bodies 12a, but not be absorbed by the material itself. The preparation aid(s) 12 may take a number of different forms, some examples of which are described below.

The finished beverage or food product may be, for example, coffee, tea, chocolate, dairy-based beverages, soups, desserts, juices and so on. The ingredients 11 which are used are particulate solids and may be powdered, ground, or leaf-based. The ingredients 11 may be insoluble or soluble or include a mixture of ingredients some of which are insoluble and some of which are soluble. Examples of such ingredients therefore include roast and ground coffee, leaf tea, powdered soup, milk powder, chocolate powder, flavoured coffee-mix powders, juice concentrates, herbs, spices, custard powder, gravy, pharmaceutical preparations, rehydratable flu remedies etc.

In a first embodiment of the invention, shown in FIG. 1, the preparation aid 12 comprises a plurality of small buoyant bodies 12a which are mixed in with the ingredients 11. The buoyant bodies 12a may be spherical, pseudo-spherical, ellipsoid or of another shape. The surface of the buoyant bodies 12a may be smooth or may include projections such as ridges or prongs. The buoyant bodies 12a may be solid or include internal hollows which allow the liquid to flow there through. Suitable materials for the bodies 12a include inter alia glass, plastics such as polypropylene and polyethylene, cellulose, seed husks, metal composites and combinations of materials.

The buoyant bodies 12a may all be of substantially the same size, or they may be different sizes. The optimal size and distribution of the bodies 12a is selected according to the nature of the ingredients 11 and the desired characteristics of the product to be prepared. A suitable range of diameters for the buoyant bodies 12a lies in the range of 0.1 mm to 200 mm and more preferably in the range of 1 mm to 200 mm. In some applications the diameters may lie in the range of 100 to 200 mm. The ratio by volume of buoyant bodies 12a to ingredients may lie in the range of 1 to 25%, As the liquid enters the chamber 23 and mixes with the ingredients 11, the buoyant bodies 12a float in the liquid and, move with the turbulent flow of liquid. As a result they impact the ingredients 11 causing physical agitation thereof which increases the mass transfer and the release of the soluble solids from the ingredients 11.

Figure 2:
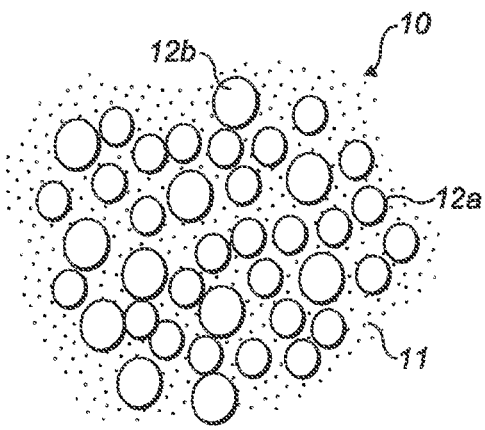
FIG. 2 is a side elevation of a sample of an alternative composition of the present invention.

In a second embodiment of the invention, shown in FIG. 2, the aid 12 comprises a plurality of small non-buoyant bodies 12b. The non-buoyant bodies 12b may again be spherical, or of another shape, and may have a similar range of sizes as those described above.

Suitable materials for the non-buoyant bodies 12b include inter alia glass, plastics such as polypropylene and polyethylene, coffee process streams (e.g. compressed pellets of extracted spent grounds), meta composites and combinations of materials.

The effect of the non-buoyant bodies 12b is to compact the ingredients 11 to create a dense bed. As a result, the influx of liquid into the chamber 23 does not substantially disturb this compact bed and the non-buoyant bodies 12b prevent the initial stirring during the early stages of the preparation process. They also prevent, or reduce further, mixing during extraction. This is particularly suitable for a beverage which is to be brewed.

In a third embodiment of the invention, the composition 10 comprises two preparation aids 12 being a mixture of buoyant bodies 12a and non-buoyant bodies 12b. The non-buoyant bodies 12b create a dense compact bed in the bottom of the chamber 23, which creates a back pressure, and the buoyant bodies 12a impact loose ingredient material to increase the release of soluble solids therefrom. This would be particularly suitable for products with two ingredients, such as coffee and creamer or sugar, or tea and creamer or sugar. The coffee grounds or tea leaves would remain compacted by the non-buoyant bodies 12b, whilst the creamer or sugar would be impacted by the buoyant bodies 12a.

In a fourth embodiment of the invention the preparation aids 12 comprise a plurality of turbulence promoting bodies 12c which include, or create, cavities and small flow paths through which the liquid flows. The cavities and small flow paths create additional turbulence in the liquid as it passes in and around the bodies 12c, which creates regions of high and low pressure, thereby aerating the mixture and increasing the yield from the ingredients 11, This can increase the aroma extraction from the ingredients 11 and, in some cases, can be used to increase the production of foam or crema in the final product.

Figure 3:
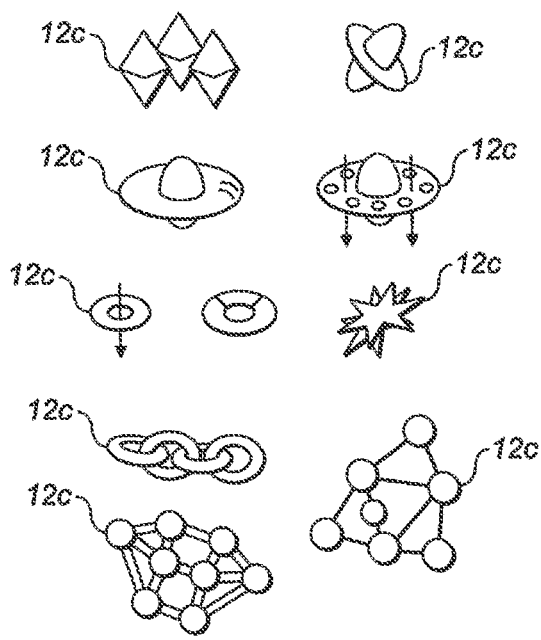
FIG. 3 is schematic representations of different preparation aids for use in the composition of FIGS. 1 and 2.

Various different shapes are suitable for these turbulence promoting bodies 12c although shapes with edges or corners or with textured surfaces are particularly useful. The shape or surface texture may be designed to create cavities and micro-channels in combination with one or more other bodies 12c is not referenced in the actually drawing. Alternatively the turbulence promoting bodies 12c themselves may incorporate internal or external cavities or channels. Interconnecting shapes are also very suitable. Some suitable shapes for the turbulence promoting bodies 12c are shown in FIG. 3.

Figure 4:
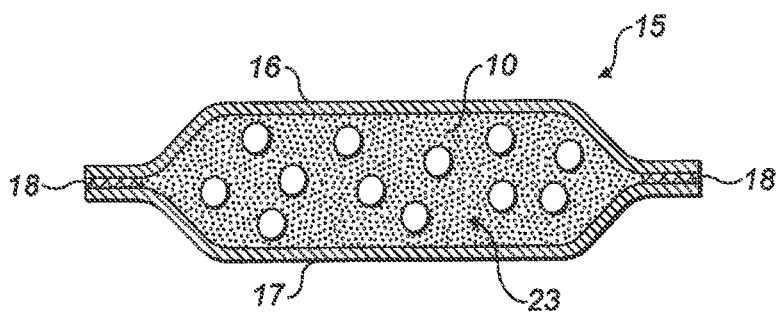
FIG. 4 is a cross section of a package in the form of a flexible pod suitable for containing the composition of the present invention.

A flexible pod 15 suitable for use in preparing a beverage or food product from the composition of the present invention is illustrated in FIG. 4, and more fully described in EP-A-0904717. The pod 15 comprises a circular top sheet 16 made from a filtering paper and a circular bottom sheet 17 or similar filter paper. The sheets 16,17 are attached around their perimeter along an annular seam 18 to enclose the composition 10.

In use the pod 15 is placed either directly, or in a supporting container, in the machine. Hot water (or other liquid) is fed under pressure so that it penetrates the pod 15, via the top sheet 16, to mix with the composition 10. The finished beverage or food product passes through the bottom sheet 17 and is directed by means of grooves (usually in the supporting container) to an outlet for discharge into a receptacle such as a cup or bowl.

Figure 5:
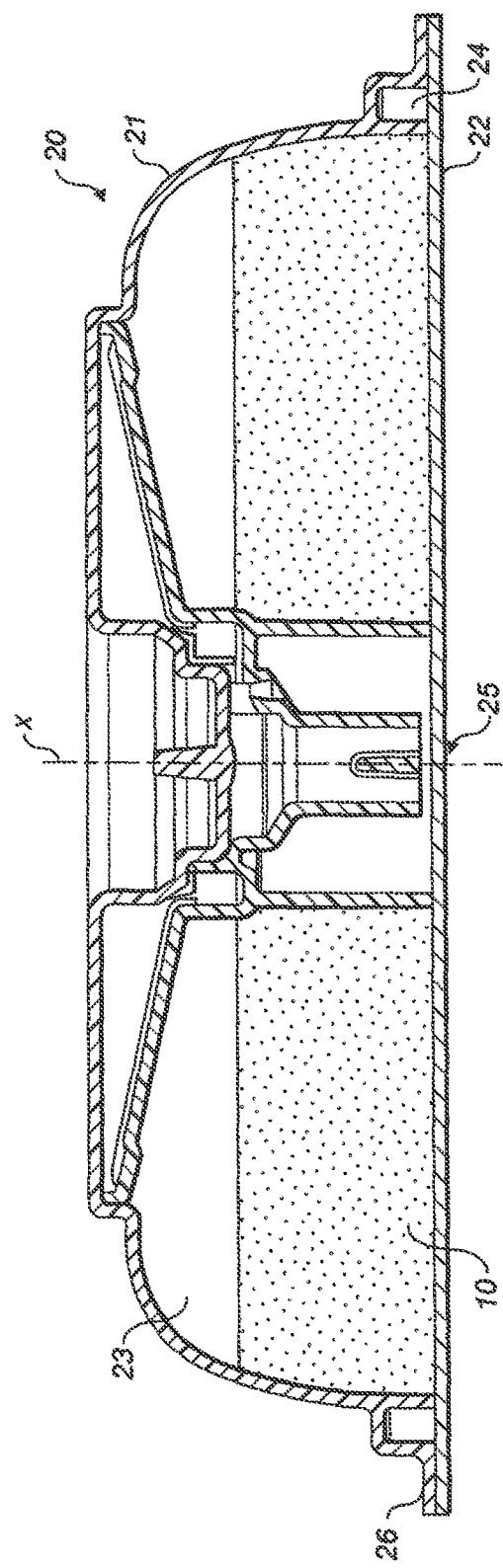
FIG. 5 is a cross section of a package in the form of a rigid cartridge, which is also suitable for containing compositions described in the present invention.
Figure 6:
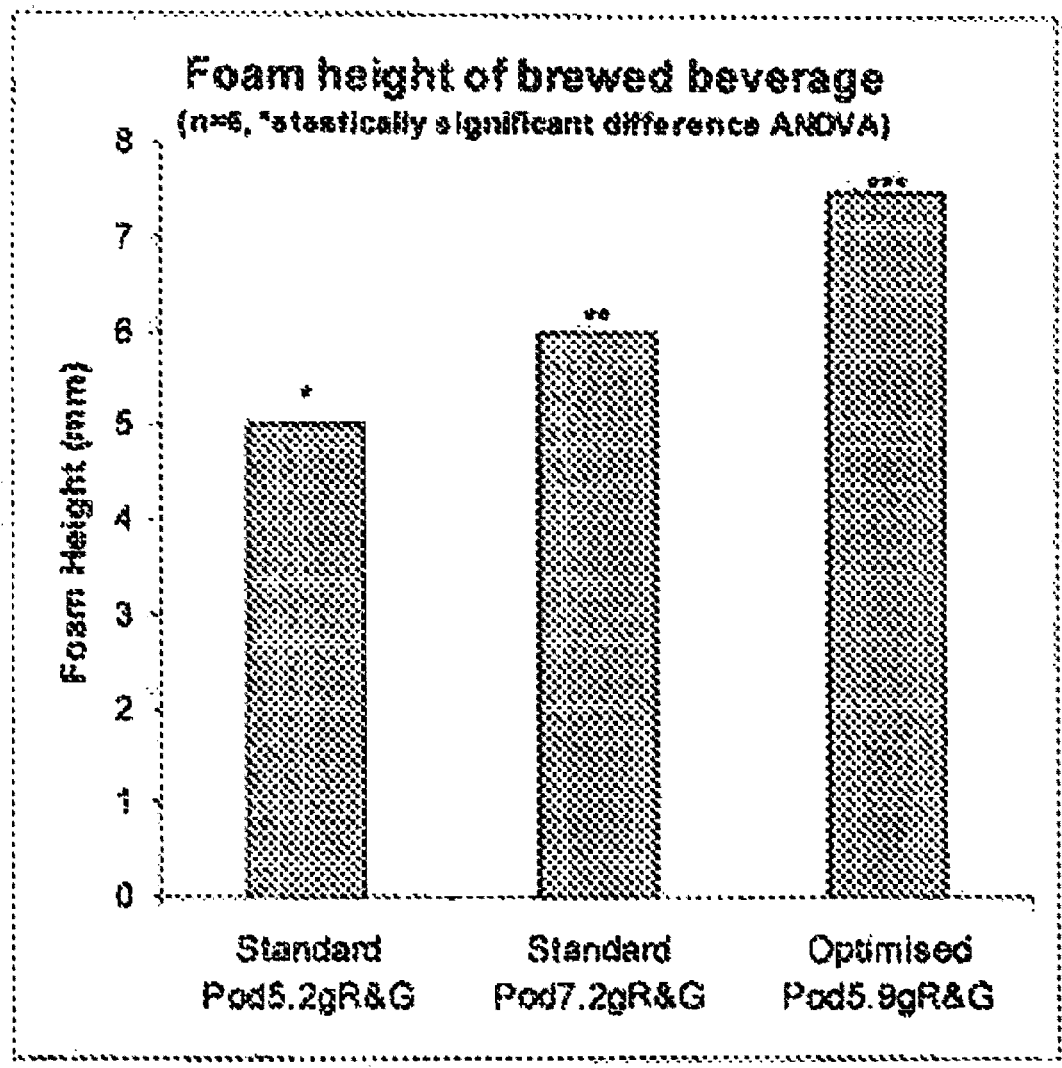
FIG. 6 is a bar graph showing foam height of brewed beverage.
Figure 7:
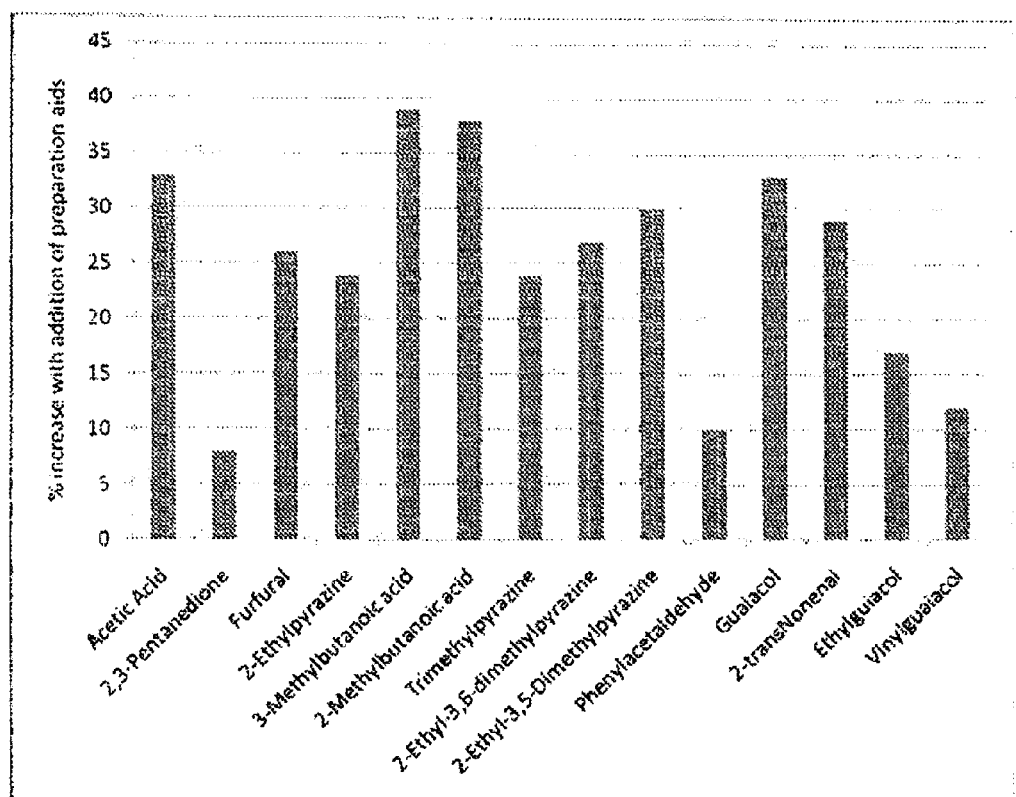
FIG. 7 is a bar graph showing impact of the addition of preparation aids.

A rigid type cartridge 20 which is also suitable for preparing a food or beverage product from the composition of the present invention is illustrated in FIG. 5, and more fully described in EP-A-1440903, The cartridge 20 generally comprises a casing 21 and sealing means 22. The casing 21 at least partly defines a chamber 23 containing the composition 10. The chamber 23 has an inlet 24, an outlet 25 and provides a fluid flow path linking the inlet 24 to the outlet 25. The inlet 24 and outlet 25 are initially sealed by the sealing means 22 and are opened, in use, by piercing or cutting of the sealing means 22.

In use the water (or other liquid), under pressure, enters the cartridge 20 and flows into the chamber 23 through the inlet 24. The water flows into the chamber 23 and mixes with the composition 10 contained therein. The finished beverage or food product passes to the outlet 25 where it is directed by the machine for discharge into a receptacle such as a cup or bowl.

The following illustrates the effect of the preparation aid 12 of the present invention.

Jacobs Kroneung roast and ground coffee was ground to an average particle size of 400 to 500 microns to use as the ingredients 11. Three sets of soft pods 15 were constructed using standard filter paper, and coffee beverage was prepared from the three sets of pods 15 with a standard pod extraction machine such as is described in EP-A-0904717. The resultant beverages were evaluated for aroma profile, foam height, and brew yield.

One set of pods 15 was filled with a fill weight of 5.2 g of the roast and ground coffee. A second set of pods 15 was filled with a fill weight of 7.2 g of the roast and ground coffee. A third set of pods 15 was filled with the composition of the present invention, comprising 5.9 g of the roast and ground coffee and 1.3 g of a preparation aid 12 comprising a plurality of non-buoyant bodies 12b in the form of highly textured (ridged) ovoid polypropylene beads of a diameter of 10 mm.

Evaluation 1: Crema/Foam Optimisation

The foam height was measured in a standard transparent laboratory beaker (having an internal diameter of 85 mm) within 10 s of brewing and the results are shown in the table and bar chart below. There was a statistically significant (ANOVA with Tukeys, n=6, $P<0.05$) increase in foam height in the pods containing the preparation aid 12. This result is in direct contrast to the reduction that is normally observed when the total roast and ground coffee material ingredient weight is reduced.

| Pod Contents | Foam height (mm) |
| --- | --- |
| 5.2 g roast and ground coffee | 5 |
| 7.2 g roast and ground coffee | 6 |
| 5.9 g roast and ground coffee and 1.3 g preparation aid | 7.5 |

Evaluation 2: Aroma Optimisation

A first set of pods was prepared as described above with a fill, weight of 7.2 g of roast and ground coffee and a second set of pods was prepared with the addition of 2 g of preparation aid 12 in the form of non-buoyant 10 mm diameter textured surface glass beads. On brewing, key aroma compounds were measured in both by GC-MS using standard laboratory methods. There was a statistically significant (ANOVA with Tukeys, n=4, $P<0.05$) increase in the aroma compounds released from the pods containing the preparation aid 12 as shown in the table below.

| Aroma compound in brewed beverage | % Concentration increase |
|---|---|
| Acetic Acid | 33 |
| 2,3-Pentanedione | 8 |
| Furfural | 26 |
| 2-Ethylpyrazine | 24 |
| 3-Methylbutanoic acid | 39 |
| 2-Methylbutanoic acid | 38 |
| Trimethylpyrazine | 24 |
| 2-Ethyl-3,6-dimethylpyrazine | 27 |
| 2-Ethyl-3,5-Dimethylpyrazine | 30 |
| Phenylacetaidehyde | 10 |
| Guaiacol | 33 |
| 2-transNonenal | 29 |
| Ethylguiacol | 17 |
| Vinylguaiacol | 12 |

Impact of the addition of preparation aids (% change in concentration of key aroma compounds in brewed beverage).

The invention claimed is:

1. A package containing a composition for preparing a beverage or food product by the addition of a liquid to said composition, the composition comprising one or more beverage or food ingredients and at least one preparation aid which promotes agitation of the ingredient(s) in the liquid, the preparation aid comprising a plurality of bodies formed from a substantially insoluble and impermeable material, in which the bodies have a diameter in the range of 0.1 mm to 200 mm, said package comprising a chamber in which the beverage or food product is prepared having an inlet for the addition of liquid to the chamber and an outlet for dispersing the prepared product, wherein the bodies are configured to float in the liquid.

2. A package as claimed in claim 1 comprising a soft pod or a semi rigid cartridge.

3. A method of producing a package as claimed in claim 1 comprising the steps of filling the package with the composition.

4. A method of dispensing a beverage or food product during an opening cycle from a package as claimed in claim 1, the method comprising the steps of passing a liquid through the inlet of the chamber to dispense the beverage or food product out of the outlet and into a receptacle.

5. A beverage or food dispensing system comprising a package according to claim 1 in combination with a beverage or food dispensing machine adapted to receive the package and to dispense a beverage or food product therefrom by the addition of a liquid.

6. A package as claimed in claim 1 in which the bodies have a shape or structure including a plurality of edges and/or corners.

7. A package as claimed in claim 1 in which the bodies have a shape or structure which promotes turbulent flow of liquid flowing in or around the bodies.

8. A package as claimed in claim 1 in which the bodies have a smooth surface.

9. A package as claimed in claim 1 in which the bodies are substantially of the same size.

10. A package as claimed in claim 1 in which the bodies are of at least two different sizes.

11. A package as claimed in claim 1 in which the preparation aid further comprises non-buoyant bodies.

12. A package as claimed in claim 1 in which the bodies have a diameter in the range of 1 mm to 20 mm.

13. A package as claimed in claim 1 in which the bodies have a diameter in the range of 100 mm to 200 mm.

14. A package containing a composition for preparing a beverage or food product by the addition of a liquid to said composition, the composition comprising one or more beverage or food ingredients and at least one preparation aid which promotes agitation of the ingredient(s) in the liquid, the preparation aid comprising a plurality of bodies formed from a substantially insoluble and impermeable material, in which the bodies have a diameter in the range of 0.1 mm to 200 mm, said package comprising a chamber in which the beverage or food product is prepared having an inlet for the addition of liquid to the chamber and an outlet for dispersing the prepared product, wherein the bodies are configured to impact the ingredient(s) in response to the addition of liquid to the chamber and cause physical agitation of the ingredient(s) in the liquid.

15. A package as claimed in claim 14 comprising a soft pod or a semi rigid cartridge.

16. A package as claimed in claim 14 in which the bodies have a shape or structure including a plurality of edges and/or corners.

17. A package as claimed in claim 14 in which the bodies have a shape or structure which promotes turbulent flow of liquid flowing in or around the bodies.

18. A package as claimed in claim 14 in which the bodies have a smooth surface.

19. A package as claimed in claim 14 in which the bodies are substantially of the same size.

20. A package as claimed in claim 14 in which the bodies are of at least two different sizes.

21. A package as claimed in claim 14 in which the bodies have a diameter in the range of 1 mm to 20 mm.

22. A package as claimed in claim 14 in which the bodies have a diameter in the range of 100 mm to 200 mm.

* * * * *